D. D. DICKINSON.
MUD LUG ATTACHMENT TO VEHICLE WHEELS.
APPLICATION FILED AUG. 2, 1917.
1,295,710.
Patented Feb. 25, 1919
2 SHEETS—SHEET 2.
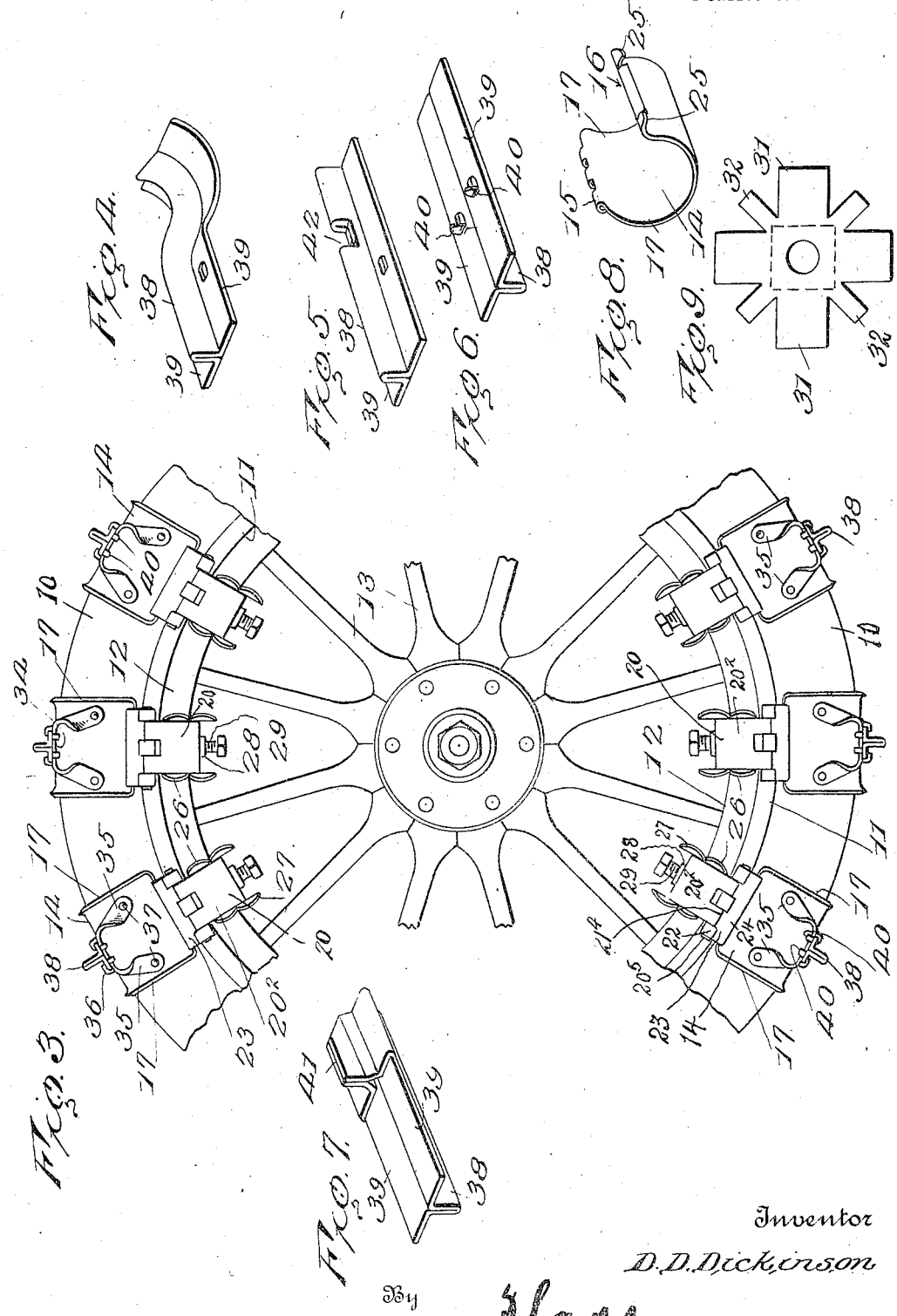
Inventor
D. D. Dickinson
By
Attorneys.

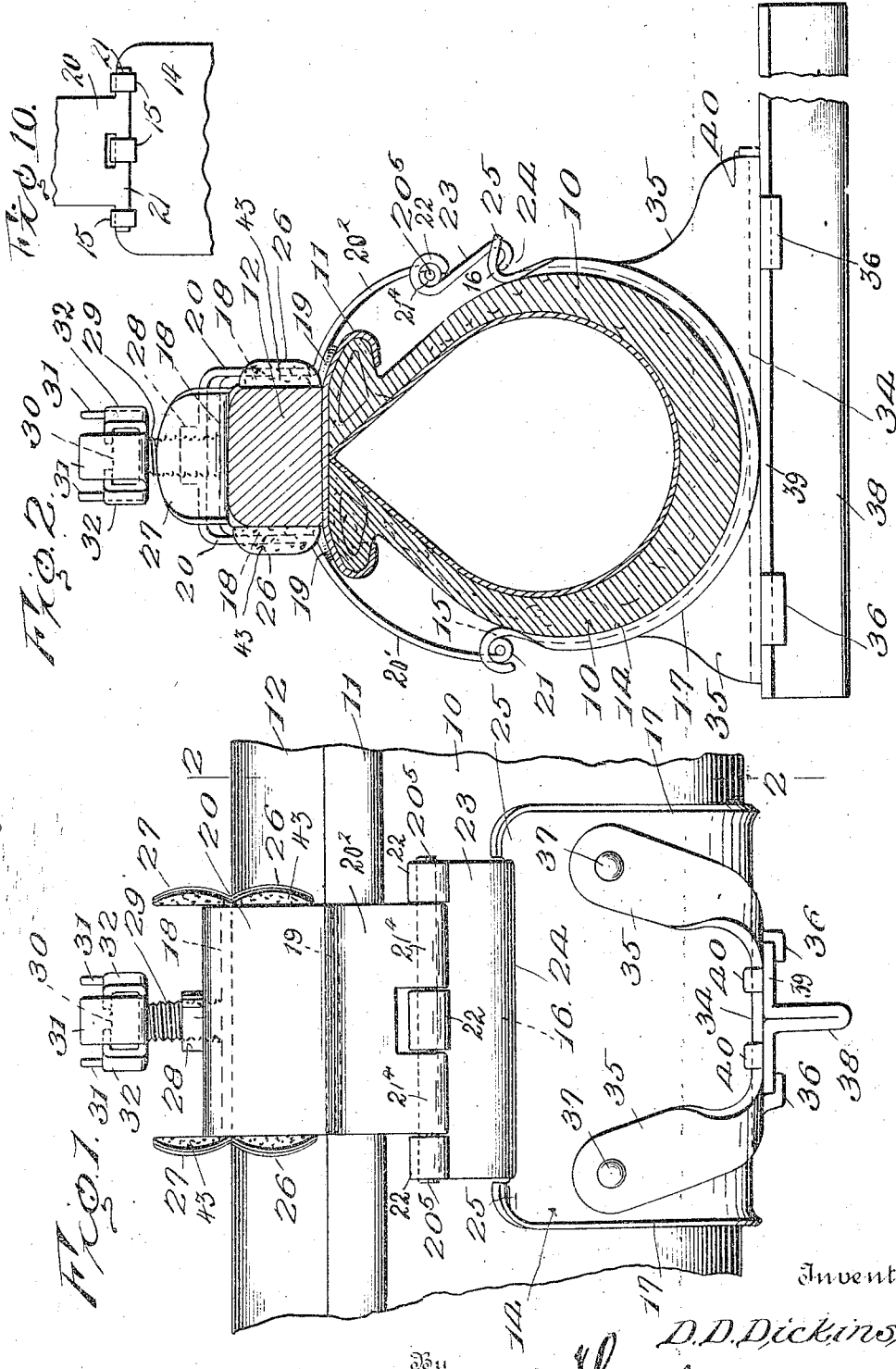

UNITED STATES PATENT OFFICE.

DEAN D. DICKINSON, OF AYR, NORTH DAKOTA.

MUD-LUG ATTACHMENT TO VEHICLE-WHEELS.

1,295,710. Specification of Letters Patent. Patented Feb. 25, 1919.

Application filed August 2, 1917. Serial No. 184,119.

*To all whom it may concern:*

Be it known that I, DEAN D. DICKINSON, a citizen of the United States, residing at Ayr, in the county of Cass and State of North Dakota, have invented certain new and useful Improvements in Mud-Lug Attachments to Vehicle-Wheels, of which the following is a specification.

This invention relates to gripping or mud engaging attachments for wheels, and has for one of its objects to provide a simply constructed device which may be applied without material structural change to wheels of various forms and sizes, and includes a plurality of lugs disposed transversely of the wheel and adapted to engage the ground as the wheel advances, the lugs extending beyond the normal path of the wheel at one or both sides to increase the width of tread or "grip" of the wheel and correspondingly increase its tractive force, and engage the ground where it is firmer and harder and thus prevent slipping.

Another object of the invention is to provide a device of this character which may be readily attached to or detached from the wheel rim without disconnecting any of the parts of the wheel, and which may be adjusted upon the wheel and thus adapt the device to wheels of varying sizes and shapes.

Another object of the invention is to provide a device of this character wherein provision is made for detachably connecting the transverse mud engaging members to the wheel tire and rim so that members of various forms and sizes may be applied without detaching the wheel engaging portion.

With these and other objects in view, the invention consists in certain novel features of construction, as hereinafter shown and described and then specifically pointed out in the claims.

The invention may be applied without material structural change to wheels constructed with an ordinary felly and tire, to automobile truck wheels having solid rubber tires, or to automobile wheels having inflatable tires or casings, and I do not, therefore, desire to limit the invention to any specific form of wheel to which it may be applied. For the purpose of illustration the improved device is shown applied to a conventional automobile tire, and in the drawings—

Figure 1 is a side elevation of one of the improved attachments applied to a section of an automobile tire;

Fig. 2 is an end elevation of the same with the felly and tire casing in section on the line 2—2 of Fig. 1;

Fig. 3 is a side elevation of a portion of a wheel with the invention applied;

Figs. 4, 5, 6 and 7 are detached perspective views of various forms of the ground engaging lugs;

Fig. 8 is a detached perspective view of one of the shells;

Fig. 9 is a view of the blank from which the clamp bolt rotating member is constructed.

Fig. 10 is a detail illustrating the manner whereby one of the wing extensions of the housing is swingingly coupled to the shell.

The pneumatic tire casing is represented conventionally at 10, the rim at 11, the felly at 12 and spokes of the wheel at 13.

The improved device comprises a plurality of shell members, represented as a whole at 14, and bearing over the outer portion of the tire casing 10 and with outturned inner edges 15—16, the latter being formed with a plurality of cut-out portions as shown.

Any required number of the shell members 14 and their attachments may be employed. Generally one will be disposed between each pair of the spokes, but the number may be varied as required. The mud lug attachments are precisely alike and a description of one will suffice for all.

The members 14 are disposed at uniformly spaced intervals entirely around the wheel with their confronting ends a short distance apart and are slightly outwardly curved at their ends as shown at 17, to prevent the shell members from biting into the tire casing.

Disposed over the felly member 12 from inside the wheel are bearing devices 18 which are laterally extended as shown at 19, and bear upon the rim 11 in close proximity to the felly 12, the outturned portions 19 thus serving as bearing elements to increase the contact between the portion 18 and the exposed portions of the rim 11.

Bearing over the member 18 is a housing 20 having lateral wings $20^1$ and $20^2$, the wing $20^2$ being shorter than the wing $20^1$. At its free edge the wing $20^2$ if formed into rolls $21^a$ in spaced relation, while the wing $20^1$ is formed into a roll 21, the latter being extended at the ends to project into the terminal rolled-over portions 15 at one side. By this means the member $20^1$ is hingedly united to the member 14 at one side, and is rendered sufficiently flexible to move therewith under the strains to which the device will be subjected when in use.

The wing portions 20¹—20² of the member 20 are substantially alike except that one is shorter than the other, the shorter side being divided by a central opening into parallel sides with the rolled-over portions forming hinge members.

Extending between the member 20² and the rolled-over portion 16 of the member 14 is a link plate, indicated as a whole at 23, having one edge provided with rolled-over portions 22 in spaced relation, leaving openings to receive the rolled-over portions 21⁴ of the member 20². A pintle 20⁵ extends through the rolled-over portions 21⁴ and 22 and thus hingedly couples the member 23 to the member 20², while the rolled-over portion 21 of the member 20¹ at the opposite side coacts with the rolled-over portion 15 to form a hinged connection between the member 14 and 20¹ at the left.

At its outer edge the link plate 23 is turned inwardly as shown at 24, to engage the intermediate portion of the turned-over portion 16 of the member 14, while the terminals of the turned-over portion 16, indicated at 25, are projected at a less angle than the intermediate portion, so that the portions 25 bear against the ends of the link plate 23, and thus prevent lateral movement between the parts 14 and 23.

The member 18 is trough-like in shape with the side edges turned outwardly, as indicated at 26, and the ends extended and turned at right-angles to the body portion of the member 18 as shown at 27, the portions 26 and 27 at each end of the portion 18 serving as guards to prevent longitudinal displacement of the member 18 relative to the felly housing portion 20.

The member 20 is provided with a boss 28 internally threaded to receive a clamp screw 29, the latter extending through the boss 28 and the adjacent portion of the member 20 and bearing against the felly engaging portion of the member 18. By this means it will be obvious that when the clamp screw 29 is rotated the member 18 will be forced against the felly and the rim and a strain will be applied to the member 14 to draw the latter into close contact with the tire, and thus clamp the device firmly to the wheel. The outturned portions 19 operate to extend the base of the member 18 where it contacts with the rim 11, and thus prevents undue strain on the latter and likewise prevents the edges of the member 18 from biting into the rim. At its outer end the clamp screw 29 is provided with a head 30, preferably square or in other form than round. Means are provided for rotating the clamp screw and consists in an attachment formed of sheet metal constructed initially as shown in Fig. 9 and divided by a plurality of clefts to form as many relatively wide portions 31 as there are sides to the nut and a corresponding number of relatively narrow portions 32 corresponding to the corners of the nut. The screw rotating member is provided with a central aperture 33 which engages around the bolt beneath the head 30. The portions 31 are then bent up against the sides of the nut and portions 32 bent up against the corners of the nut. The portions 31—32 are of greater length than the thickness of the nut, so that when the portions 31—32 are bent up against the nut they project beyond the outer face of the same. The narrow portions 31 are then further bent over the outer face of the nut and thus serve as anchors or locking members to firmly clamp the attachment to the head of the nut with the outer parts of the portions 31 with their edges in spaced relation and projecting beyond the other afford means for the application of an implement other than a wrench to enable the clamp screw to be rotated.

Attached to each of the members 14 is a mud hook holding bracket, preferably pressed from a strip or plate of sheet metal, and comprising a body portion 34 with extended arms 35 and H-shaped clefts whereby tongues 36 are produced. The projections 35 are bent obliquely to the longitudinal plane of the body 34 and riveted or otherwise secured at 37 to the shell portion 14, while the tongues 36 are bent outwardly to provide holding means for the road or mud engaging members or "lugs." Each of the lugs is substantially T-shaped transversely and preferably bent from a single strip of heavy sheet or plate metal. The lug members are bent to form webs 38 of two thicknesses of the metal and lateral webs 39 of one thickness of the metal. The webs 39 are designed to be inserted beneath the tongues 36 while the two-part web 38 projects beyond the outer face of the attachment. The lugs are of greater width than the attaching member 34 and are arranged with their excess length extending entirely at one side of the attaching member, the extending portion projecting beyond the outer faces of the wheels to which they are attached. Each of the web portions 39 is provided with U-shaped clefts whereby tongues 40 are released and adapted to be bent at right angles to the web portions 39 and bear against the adjacent edge of the body 34 of the attaching member. By this means the mud lug members are prevented from movement in one direction relative to the attaching members.

The lug portions of the improved device may be of any required size and modified without departing from the principle of the invention to adapt them to wheels of various sizes and forms. For instance, in some forms of automobiles the mud guards of the wheels are disposed so near the automobile wheels that it will be necessary to form bends in the projecting portions of the mud lugs as illustrated in Fig. 4 but this bending of the mud lugs to adapt the device to parts of automobiles of varying shapes and sizes would not constitute a departure from the principle of the invention.

Another permissible modification is illustrated in Fig. 7 in which the web members 39 are extended laterally at one end and the extended portion bent as shown at 41, to serve as stops to limit the movement of the mud lugs in one direction, the bent portion 41 thus performing the same function as the stop lugs 40 previously described. In some forms of automobiles or like vehicles certain parts of the wheel will render it necessary to form a notch in the web portion 38, as illustrated at 42 in Fig. 5.

The attachments being precisely alike are not only interchangeable between different wheels, but in event of the breakage of one of the attachments it can be readily replaced without discarding the remaining parts.

Suitable packings of felt or like material, indicated at 43 in Figs. 1 and 2 will be employed between the portions with which the fellies and spokes contact to protect the latter from abrasion.

The member 34 extends to a greater distance at the projecting side of the member 38 than at the other side as illustrated in Fig. 2, to increase the width of the bearing or support for the mud lugs or hooks.

The ground engaging members 38 by extending beyond the ground engaging portions of the tire or tire casing, materially increase the width of the tread or the "grip" of the wheel and correspondingly increase the tractive force of the wheel.

The mud lugs are thus caused to engage the firmer and harder portions of the ground at the sides of the normal track of the wheel.

Having thus described the invention, what is claimed as new is:

1. An attachment of the class described comprising a shell member adapted to engage over a wheel tire, means for coupling said shell to said wheel tire, a bracket device including a body portion having a plurality of arms secured to said shell and a plurality of coacting tongues projecting therefrom, and a ground engaging member including lateral webs engaging beneath said tongues and coupled thereby to said bracket device.

2. An attachment of the class described comprising a shell member adapted to engage over a wheel tire, a guard member bearing over the felly and having laterally directed projections, a member including a housing portion engaging over the guard member and having coacting wing portions bearing upon the extensions of the guard member, means for coupling said wing portions to said shell, and clamping means carried by said housing portion and operating to attach the shell to the wheel felly.

3. An attachment of the class described comprising a shell member adapted to engage over a wheel tire, a member including a housing portion adapted to engage over a wheel felly and having lateral wings, means for coupling said lateral wings to said shell, a guard member within said housing portion and having combined guard wings and stops engaging the same, and clamping means carried by said housing portion and operating to compress the guard member against the wheel felly and thereby attach the shell to the wheel tire.

In testimony whereof I affix my signature.

DEAN D. DICKINSON. [L. S.]